J. D. FIRMIN.
POWER SYSTEM.
APPLICATION FILED MAY 29, 1912.
1,230,471.  Patented June 19, 1917.
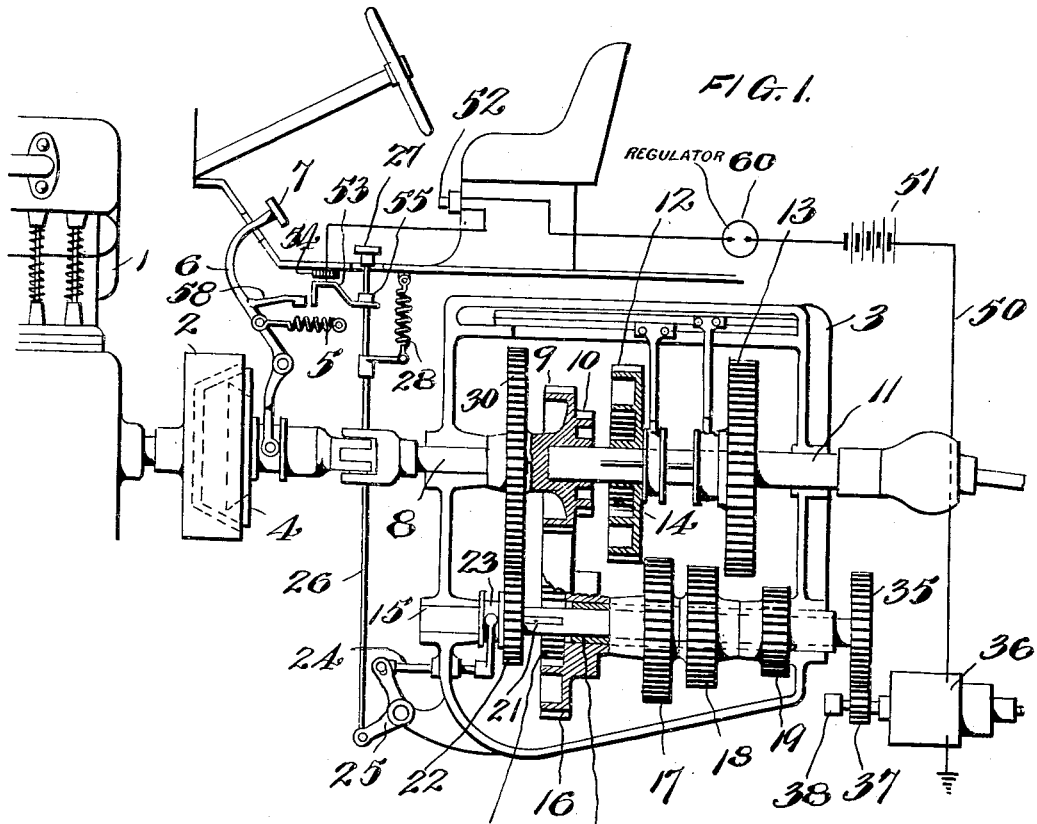
FIG. 1.
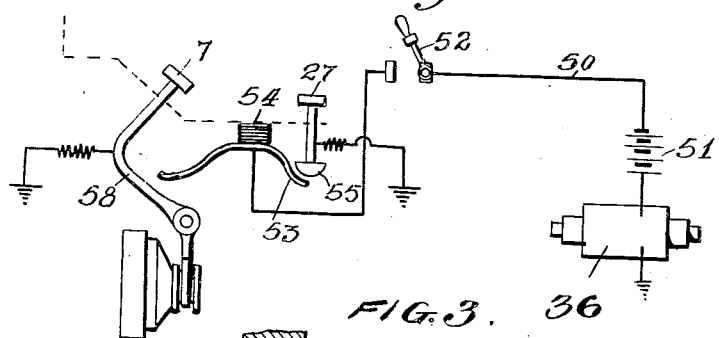
Fig. 2.
Fig. 3.
WITNESSES  INVENTOR

UNITED STATES PATENT OFFICE.

JOHN D. FIRMIN, OF PHILADELPHIA, PENNSYLVANIA.

POWER SYSTEM.

1,230,471.   Specification of Letters Patent.   Patented June 19, 1917.

Application filed May 29, 1912. Serial No. 700,430.

*To all whom it may concern:*

Be it known that I, JOHN D. FIRMIN, a citizen of the United States, residing in the city of Philadelphia, State of Pennsylvania, have invented a new and useful Power System, of which the following is a specification.

My invention relates to a power system which is particularly adaptable to use in motor vehicles, but which may be adapted to other applications. A principal object of the invention is to provide positive starting means for the gas engine. Another object is to make this starting means, which is preferably an electric motor, act through the change-speed gearing of the car. A further object is to include the friction or main clutch of the vehicle in the transmission line between the electric motor and the engine, and another object attained by this means is to utilize the momentum or spinning energy of the driven clutch member, impelled by the electric motor, prior to clutch engagement, to assist in the starting effort, thus relieving the load on the electric motor and permitting the use of a smaller motor than would otherwise be necessary. A further object is to adapt and arrange the parts so that the invention can be utilized in connection with existing change-speed devices, or by slight changes in such devices. A further object is to combine in the electric motor the functions of a generator for supplying current for various uses in the car, such as lighting, ignition, etc., and to arrange the circuit and electrical connections to facilitate starting the motor, and to facilitate the proper control of the electric machine under different running conditions, as will appear.

The foregoing and other objects and advantages of the invention are sufficiently explained hereinafter in connection with a detailed description of the accompanying drawing which shows an exemplifying structure embodying the invention. It is to be understood that the invention is capable of embodiment in many different forms.

Figure 1 is a diagrammatic view showing a representative form of change-speed gearing, partly in section, the essential parts of a gas engine and clutch, and the other necessary elements of the invention.

Fig. 2 is a circuit diagram.

Fig. 3 is an enlarged sectional detail of a suitable governor for pinion 37.

Reference character 1 designates a gas engine having a driving clutch member 2, which is usually formed in the fly wheel. 3 designates, in general, the change-speed gearing. 4 is the driven clutch member or cone provided with the engagement spring 5, pedal lever 6 and pedal 7. The primary drive shaft 8 of the gearing is connected with the clutch member 4 in the usual way. On the driving shaft is secured pinion 9 having teeth 10 for the direct drive connection. The driven gear shaft 11 carries shifting gears 12 and 13 and gear 12 is provided with internal teeth 14 for engagement with teeth 10 for the direct drive as usual in one form of selective change-speed gearing.

The gear countershaft 15 carries large gear 16 engaging pinion 9, gear 17 to engage gear 12 for one of the reduction drives, gear 18 to engage gear 13 for another reduction drive, and pinion 19 to engage gear 13 through an idler pinion (not shown) for the reverse.

I adapt such an usual engine, clutch and gear arrangement for my invention as follows:

The counter-shaft gear 16 is made fixed on its sleeve 70 and is provided with internal clutch teeth 20. The countershaft is provided with a spline 21 and with a sliding pinion 22 engaging the spline and adapted to also enter and engage the internal teeth 20 of gear 16. Pinion 22 is provided with a grooved collar 23, shifting fork and rod 24, shifting bell-crank 25, link 26 and foot-button 27. A spring 28 stretched between link 26 and a fixed support urges pinion 22 normally to engage with gear 16 so that normally the gear revolves rigidly with the shaft as usual.

In its starting position, pinion 22 engages with a large gear 30 provided on the primary gear shaft 8. This gear may, if convenient, be made operatively integral with pinion 9.

On counter-shaft 15 I also provide a large gear 35. The electric machine 36 which may be conveniently identified as a motor, although it may perform both motor and generator functions, is supported near the gear box and is provided with a small pinion 37 engaging counter-shaft gear 35. The motor shaft may also be provided with a governor 38 which may be a fly-ball governor or any other suitable type for regulating the connection of the electric motor shaft with its pinion 37. To effect this regulation, the pinion may be made free on the shaft and the fly-ball governor may carry a friction plate or plates to frictionally engage the pinion with the shaft with greater or less force, depending inversely upon the speed of the machine. For example, when the speed rises above prescribed limits, the governor will release the pinion from the shaft, more or less, and permit the shaft to take a relatively lower speed.

The drawing shows how the large motor gear 35 may be added outside the gear box without materially disturbing existing constructions. In some cases the pinion 22 and gear 30 may also be placed outside the gear box for greater economy in adaptation.

The motor circuit at one side is grounded as shown. The other side of the circuit 50 leads through the storage battery 51, to switch 52, to contact 53 mounted on insulating block 54. Foot-button 27 is provided with contact 55 to engage contact 53. Contact 55 is grounded as shown in Fig. 2. The clutch pedal 7 is also provided with a contact 58 to engage contact 53, and contact 58 is grounded as shown in Fig. 2.

Any suitable automatic regulator, indicated at 60, may be provided for protecting the battery and for controlling the input and output under various conditions. The details of the regulator do not form a part of this invention.

The structure operates as follows:

To start the gas engine, gears 12 and 13 are put in neutral position as shown and the clutch cone 4 is disengaged by pressing on pedals 7. Switch 52 is put in closed position. Foot-button 27 is depressed. This throws pinion 22 out of engagement with gear 16 as shown, and at the same time completes the electric circuit through contacts 53, 55. The electric motor 36 energized by the battery now drives the counter-shaft through pinion 37 and gear 35 at a great gear reduction, and through pinion 22 and gear 30 also drives primary gear shaft 8 and the clutch cone 4. Motor 36 is usually designed so that it is capable of running at a high speed and the clutch cone and connected rotating parts are thus spun at high speed and acquire considerable momentum energy. Pedal 7 is now released and clutch cone 4 engages the internal clutch member 2, imparting to the fly-wheel and engine the rotative energy of the electric motor acting through its powerful gear reduction, and also the momentum energy of the clutch cone and connected parts. As soon as the pedal 7 is released the electric circuit is completed through contacts 53, 58, and foot-button 27 may be released without affecting the circuit. Pinion 22 thereupon becomes disengaged from gear 30 and engages gear 16. The gas engine having received a positive starting impulse now commences to run on its own account, and as soon as it does the clutch 4 may be again released, the proper gear pinion engaged and the car started by again permitting the clutch to engage.

The described circuit arrangement prevents the electric motor from wasting electric energy by tending to drive the car when the clutch is released in ordinary driving, because whenever the clutch is released, the motor circuit is broken at contacts 53, 58.

The invention also provides means for actually impelling the car by the electric motor for a short distance. When it is desired to do this, all the counter-shaft gears except pinion 22 and gear 35 are rigidly mounted on a sleeve 70, and this sleeve is made revoluble on the counter-shaft. The clutch is disengaged while one of the gear combinations, usually the lowest speed combination, is left in operative position. For instance, gear 13 is left in engagement with pinion 18 and the clutch released. Foot-button 27 is then depressed, releasing pinion 22 from gear 16 and engaging it with gear 30. At the same time the electric circuit is closed through contacts 53, 55. The electric motor now drives the gear counter-shaft and pinion 22 at a considerable speed reduction. Pinion 22 drives gear 30 at another considerable reduction. Gear 9 drives gear 16 at a further reduction. Through sleeve 70, pinion 18 drives main shaft gear 13 at another reduction, and this motion is transmitted to the driving wheels. It will thus be evident that an immense speed reduction is obtained for driving the car and that this result may be successfully accomplished even when a very small electric motor is employed.

In starting the gas engine, it will be noticed that when clutch 4 is permitted to engage and the gas engine begins to revolve, it will at once begin to drive the electric motor at a high rate of speed by reason of the geared up connection from the gas engine to the motor. To prevent injury to the electric motor, the governor 38 will act to keep the motor speed down to the intended rate. As soon as it is observed that the gas engine has started, however, button 27 is released, permitting pinion 22 to reëngage with gear 16. Counter-shaft 15 is now driven through pinion 9 and gear 16 instead of through gear 30. If pinions 9 and 37 and gears 16 and 35, respectively, are made of the same sizes, the electric motor will be driven at the engine speed and excessive governor action will be avoided. At the same time the governor will act properly to protect the battery when engine speed rises above a certain point.

A regulator 60 is to be employed in the electric circuit. This is to be of any suitable form for use with electrical apparatus of this character. For instance, a regulator acting by means of variable resistance to control the amount of current delivered to the battery when it is being charged may be employed, or the regulator may operate in other ways understood by persons versed in the art.

I claim:—

1. In a power system, the combination of a gas engine, a friction clutch, a primary gear shaft, a driven gear shaft, a gear counter-shaft, a sleeve revoluble thereon, transmission gears on said sleeve, transmission gears on said primary and driven shafts, a starting motor connected to said counter-shaft, and a shiftable starting connection intermediate said counter-shaft and said primary shaft.

2. The combination with an organization comprising an internal combustion engine, apparatus to be driven thereby, means, including an intermediate driving shaft, in which the power output of the motor may be accumulated in the form of energy of rotation, and mechanism adapted to connect the intermediate shaft to the engine and to the apparatus to be driven, or to disconnect it from the engine and from the apparatus to be driven; of a starting motor for the engine, a disengageable connection between the motor and the intermediate driving shaft including speed-reducing gearing, and a supplemental driving connection between the engine and the motor, whereby the motor may be driven as a generator; substantially as described.

3. In apparatus for starting internal combustion engines from rest to initiate the normal cycle of operations thereof, a starting motor, an intermediate driving shaft in which the power output of the motor may be accumulated in the form of energy of rotation, a driving connection between the motor and the shaft, and means for connecting the rotating shaft to the engine to start it; substantially as described.

4. In apparatus for starting internal combustion engines from rest to initiate the normal cycle of operations thereof, a starting motor, an intermediate driving shaft in which the power output of the motor may be accumulated in the form of energy of rotation, a driving connection between the motor and the shaft, and means for simultaneously connecting the motor and the rotating shaft to the engine to start it; substantially as described.

5. In apparatus for starting internal combustion engines from rest, a starting motor, an intermediate driving shaft in which the power output of the motor may be accumulated in the form of energy of rotation, a driving connection between the motor and the shaft, and means for operatively connecting the shaft to the engine while the shaft is being driven by the motor; substantially as described.

6. In apparatus for starting internal combustion engines from rest, an intermediate driving shaft, a starting motor, a disengageable driving connection between the motor and the shaft, a clutch for connecting the shaft to the engine and for disconnecting it therefrom, and governing means for automatically controlling the motor speed at a predetermined speed of the engine.

7. The combination with an organization comprising an internal combustion engine, apparatus to be driven thereby, an intermediate driving shaft, and mechanism adapted to connect the intermediate shaft to the engine and to the apparatus to be driven, or to disconnect it from the engine and from the apparatus to be driven; of mechanism for starting the internal combustion engine from rest to initiate the normal cycle of operation thereof; consisting of a starting motor, and governing means for automatically controlling the motor speed at a predetermined speed of the engine.

8. The combination with an organization comprising an internal combustion engine, apparatus to be driven thereby, an intermediate driving shaft, and mechanism adapted to connect the intermediate shaft to the engine and to the apparatus to be driven, or to disconnect it from the engine and from the apparatus to be driven; a starting motor for the engine, a disengageable connection between the motor and the intermediate driving shaft including speed-reducing gearing, and a supplemental driving connection between the engine and the motor, whereby the motor may be driven as a generator; substantially as described.

JOHN D. FIRMIN.

Witnesses:
HESTER J. SYDNOR,
W. R. HUMMEL.